United States Patent [19]
Beckwith

[11] Patent Number: 5,462,423
[45] Date of Patent: Oct. 31, 1995

[54] APPARATUS FOR NON-MECHANICAL DIE LIP TEMPERATURE ADJUSTMENT IN AN EXTRUDER

[75] Inventor: Robert W. Beckwith, Cummaquid, Mass.

[73] Assignee: Sencorp Systems, Inc., Hyannis, Mass.

[21] Appl. No.: 45,477

[22] Filed: Apr. 13, 1993

[51] Int. Cl.⁶ .................................................. B29C 47/20
[52] U.S. Cl. ........................ 425/141; 264/40.6; 425/144; 425/378.1
[58] Field of Search ..................... 425/141, 144, 425/145, 378.1, 466; 264/40.6, 40.7

[56] References Cited

U.S. PATENT DOCUMENTS

| | | | |
|---|---|---|---|
| 3,491,406 | 1/1970 | Davidson | 425/466 |
| 3,775,035 | 11/1973 | Scotto et al. | 425/141 |
| 3,840,318 | 10/1974 | Solop | 425/466 |
| 3,973,890 | 8/1976 | Porter et al. | |
| 3,984,508 | 10/1976 | Solop | |
| 4,057,385 | 11/1977 | Yazaki et al. | |
| 4,201,534 | 5/1980 | Phipps | |
| 4,425,290 | 1/1984 | Upmeier et al. | 425/141 |
| 4,548,570 | 10/1985 | Hahn et al. | |
| 4,749,531 | 6/1988 | Borger et al. | 425/141 |
| 4,793,788 | 12/1988 | Borger et al. | 425/141 |
| 4,882,104 | 11/1989 | Dobrowsky | 425/141 |
| 5,116,211 | 5/1992 | Shinmoto | 425/466 |

FOREIGN PATENT DOCUMENTS 63-183826  7/1988  Japan ..................... 425/141

*Primary Examiner*—Jay H. Woo
*Assistant Examiner*—Joseph Leyson
*Attorney, Agent, or Firm*—Richard P. Crowley

[57] ABSTRACT

Apparatus for extruding thermoplastic material includes an extruder having inner and outer die lips adjacent an outlet end of the extruder for transporting an annular stream of thermoplastic material therethrough. The outer die lips are divided into a plurality of circumferential sectors. Each sector includes a passage for circulating heated oil for controlling the viscosity of the thermoplastic material being extruded. The temperature and flow of the heated oil flowing through each sector may be varied according to the required thickness of the product being extruded adjacent that sector. A ring-shaped channel carries the heated oil around the die lips for circulation into the individual sectors.

8 Claims, 3 Drawing Sheets

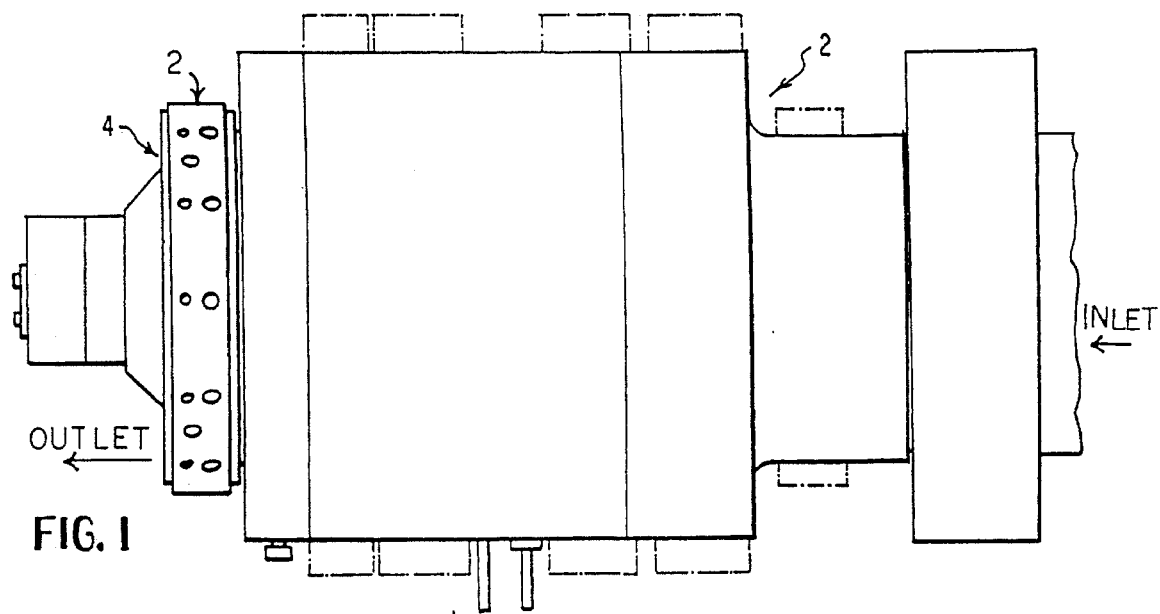
FIG. 1
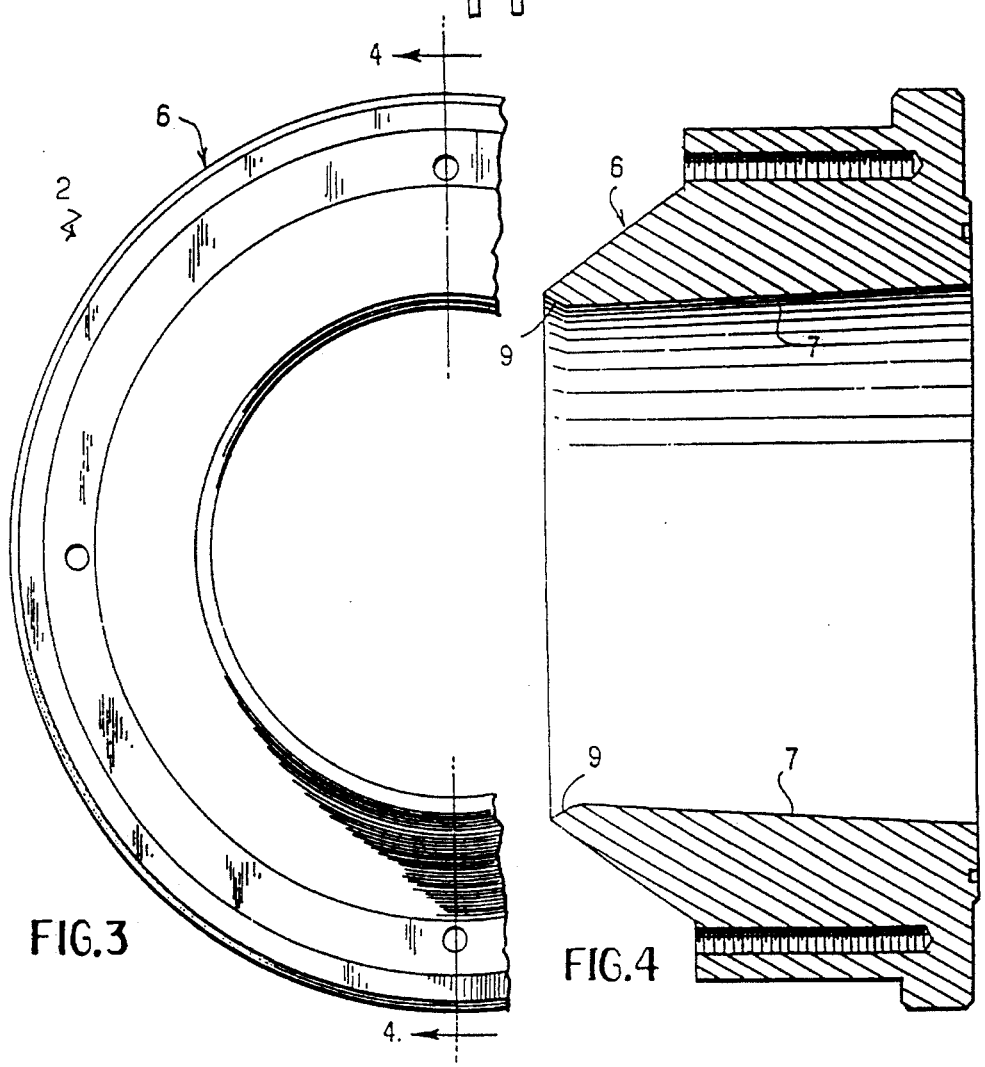
FIG. 3
FIG. 4

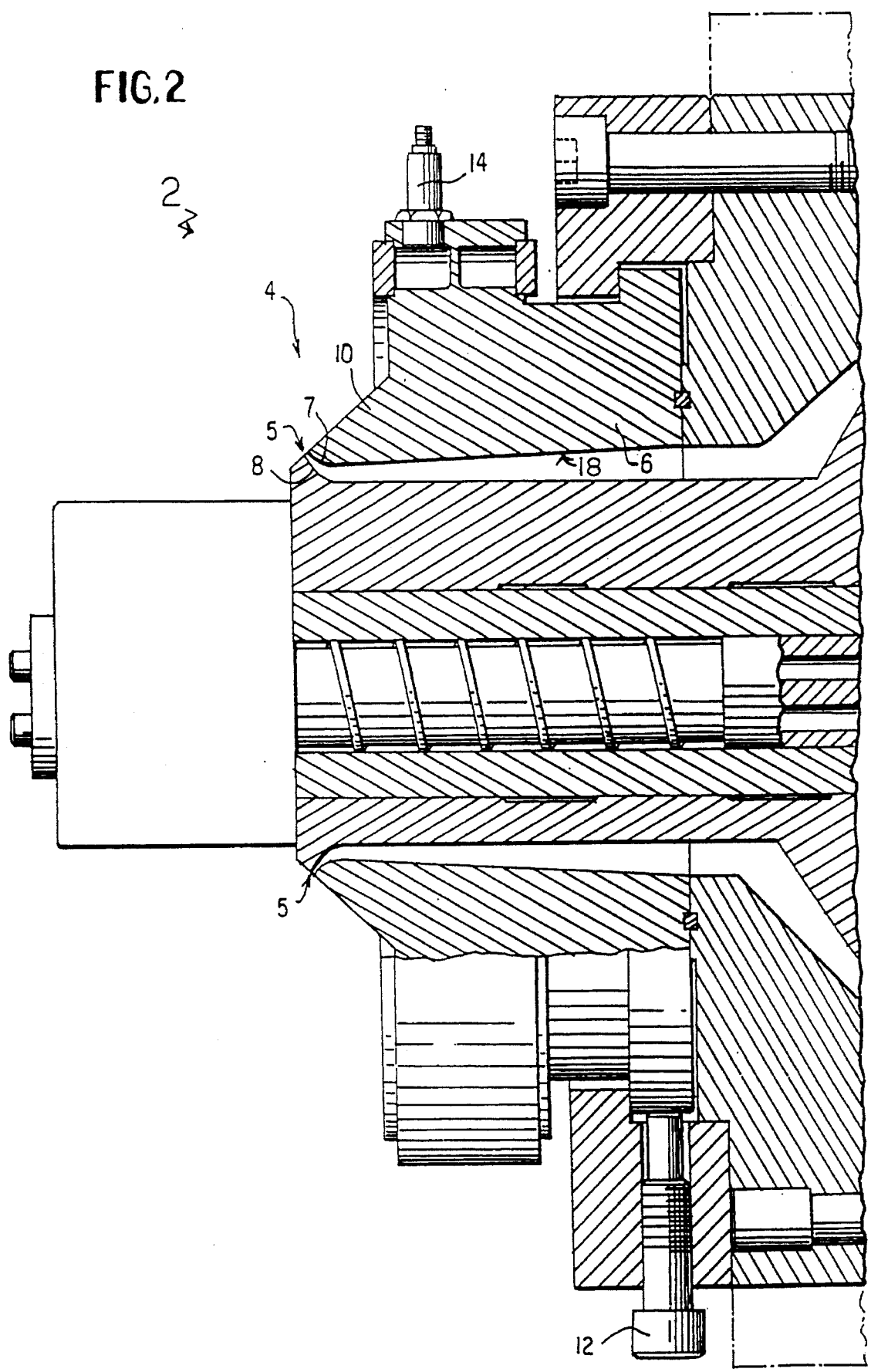

APPARATUS FOR NON-MECHANICAL DIE LIP TEMPERATURE ADJUSTMENT IN AN EXTRUDER

FIELD OF THE INVENTION

This invention relates to the temperature adjustment of the outer die lip in an extruder for plastic materials.

BACKGROUND OF THE INVENTION

Circular extrusion dies with inner and outer lips are usually adjusted for concentricity by a circle of bolts located radially around the outer die lip. Concentricity adjustment is necessary to achieve a consistent transverse thickness of the material leaving the die. In most cases, the adjusting bolts move the complete outer lip to obtain concentricity with the inner lip. A compromise is needed due to temperature and machining variations around the two lips. Where a higher degree of control is desired, a flexible outer lip may be used. The adjusting bolts push on segmented shoes which flex a small sector of the outer lip. This forces the lip into the desired shape to achieve uniform thickness of material. Heated expansion bolts are a further sophistication allowing a finer, remote controlled adjustment. Flexible lip dies suffer from a number of deficiencies, such as undesired distortion of areas adjacent to the sector being flexed by an adjusting bolt, requirement for large forces to flex the lips making repeatability and fine adjustment difficult, necessity for construction of a very thin flex lip which is then susceptible to machining distortion and damage, and complications in heat transfer to and from the outer die lip due to thin construction and intimate contact with the segmented shoes around the periphery.

Hahn, et al., U.S. Pat. No. 4,548,570, describes an extrusion apparatus for producing thermoplastic pipe. Adjustment of the thickness of the pipe is achieved by varying the heat to heater cartridges which causes thermoplastic material in proximity to the heated section of sleeve to become less viscous and to flow at a faster rate. This increases the amount of thermoplastic material at that location, compared with lesser heated sections of the extrusion passageway. Additionally, radial repositioning of the sleeve due to expansion of the heater bolts will increase the width of the arcuate portion of the melt passageway in proximity to the heated section of the sleeve, causing increased thickness of the thermoplastic material. This heating operation does not appear to take place at the die lips. Phipps, U.S. Pat. No. 4,201,534 describes a foam extrusion die assembly which is adjusted by means of screws in the area of the die lips. Yazaki, et al., U.S. Pat. No. 4,057,385, describes cooling a deckle so as to increase the viscosity of the molten resin around the deckle, to prevent leakage. Solop, U.S. Pat. No. 3,984,508, also describes a method of controlling an extrudate using a deckle bar having heating and cooling means. Porter, et al., U.S. Pat. No. 3,973,890, describes adjusting relative positions of the die plates to maintain a constant pressure of heat plastified material. The temperature of the pellet cutting head can be heated or cooled by circulating fluids.

SUMMARY OF THE INVENTION

The invention relates to an apparatus for extruding thermoplastic material comprising a housing having an inlet end and an outlet end and a bore therebetween, annular extrusion means comprising inner and outer die lips adjacent said outlet end for transporting an annular stream of the thermoplastic material therethrough, passage means in said outer die lip for circulating heated oil for controlling viscosity of the thermoplastic material, whereby the thickness of the thermoplastic material being extruded is controlled by varying the temperature of the heated oil flowing through said passage means. The outer die lip of the apparatus comprises a plurality of sectors around the circumference of said die lip and each said sector includes a passage for circulating heated oil, the outer die lip further comprising a ring means for containing the heated oil circulated in said passage means.

Hot oil, which is often already being supplied to the inner and outer sections of the die, is used to effect a temperature variation in multiple sectors around the die lip. Passageways are machined into the lip to carry hot oil in and out of the sectors. When the volume of hot oil flowing through a sector is adjusted, either thicker material or thinner material can be obtained. For thicker material, the corresponding sector is made hotter by allowing more hot oil to pass through it. This reduces viscosity and friction in that area, allowing more plastic to flow through. The resulting material becomes thicker. Minor corrections can also be made by this method because the hotter metal in the sector expands a little more, increasing the die gap in the area through which the hot oil passes. For thinner material adjacent a particular sector, a reduction in hot oil flow will cause the reverse effect.

Control of sector oil flow can be by manual adjustment of flow control by means of a flow control valve or can be automated by using feedback from a sheet thickness measuring gauge. Signals are processed according to a control algorithm which regulates the flow control valve through a microprocessor. Such a control algorithm for regulating the flow control valve will be apparent to one skilled in the art.

It is an object of the invention to provide a method for adjustment of the die lip of a plastics extruder by passing hot oil through channels in the die lip.

It is a further object of the invention to provide a plastics extruder having an outer die lip which is temperature adjusted by controlling a supply of hot oil through passageways to multiple sectors in the outer die lips.

BRIEF DESCRIPTION OF THE DRAWINGS

FIG. 1 is a top plan view of the exit portion of a plastics extruder.

FIG. 2 is a partial cross-sectional view of a die assembly thereof.

FIG. 3 is a partial end view of an outer die lip of the die assembly.

FIG. 4 is a cross-sectional view taken on line 4—4 of FIG. 3.

DETAILED DESCRIPTION OF THE INVENTION

Figure 6:
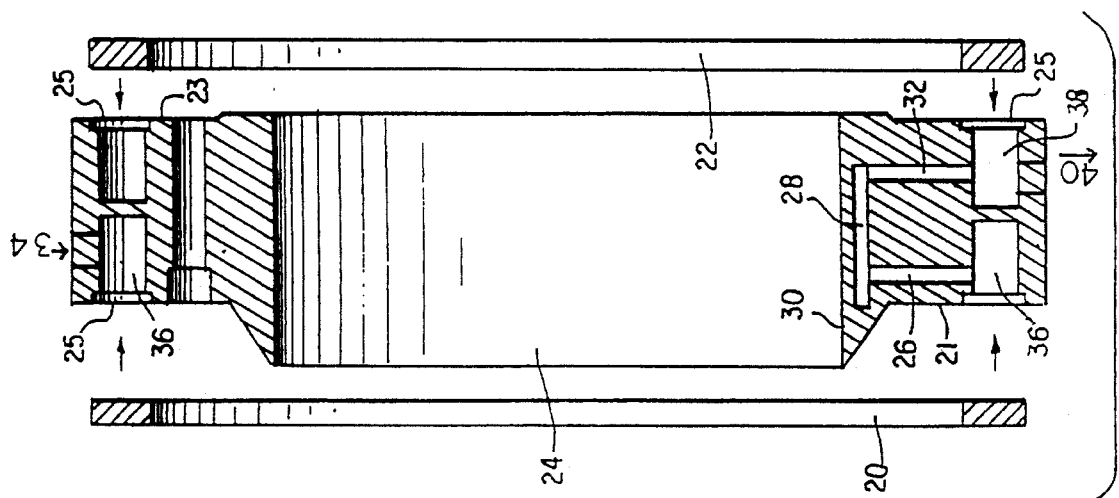
FIG. 6 is an exploded cross-sectional view taken on line 6—6 of FIG. 5.

A die assembly of the invention includes channels in sectors of an outer lip of the die assembly through which hot oil is passed. The temperature and flow of the oil is controlled for making fine adjustments of the exact size and shape of the plastics extrudate as the extrudate leaves the extruder.

The apparatus and method used provide a more accurate and more controllable adjustment than is obtained using mechanical adjustment of the die lips.

With reference to FIGS. 1 to 6, in which like numerals represent like parts, FIG. 1 shows a top plan view of a die assembly 2 of an extruder housing having an inlet end and outlet end, useful for incorporating a hot oil die lip-adjustment system of the invention. FIG. 2 shows a cross-sectional view of the forward part 4 of die assembly 2. With particular reference to the adjustment of the size of concentric die gap 5 between outer die lip 6 and inner die lip 8, the temperature of inside section 7 of outer lip 6 may be adjusted with respect to inner lip 8 by passage of oil through outer lip oil ring 10. Adjustment of bolt 12 provides coarse adjustment of concentric die gap 5. Oil flow through outer lip oil ring 10 is controlled by oil flow control valve 14. A plurality of valves 14, corresponding to the number of oil channels, are equally spaced around the die lip.

Outer die lip 6 is shown in detail in FIGS. 3 to 6. In a typical non-limiting example, outer die lip 6, such as a die lip having a 5 to 8 inch diameter, is evenly divided into twelve sectors 37, each sector containing a separate oil passageway. Other configurations using a different number of sectors may be used.

FIGS. 3 and 4 show enlarged views of outer die lip 6. The molten plastics resin flows through the bore of the extruder and exits through the die lip adjacent polished inner surface 7 of die lip 6. Forward outlet end 9 of outer die lip 6 is curved to complement the shape of inner die lip 8 to form die gap 5 through which the resin is extruded.

Figure 5:
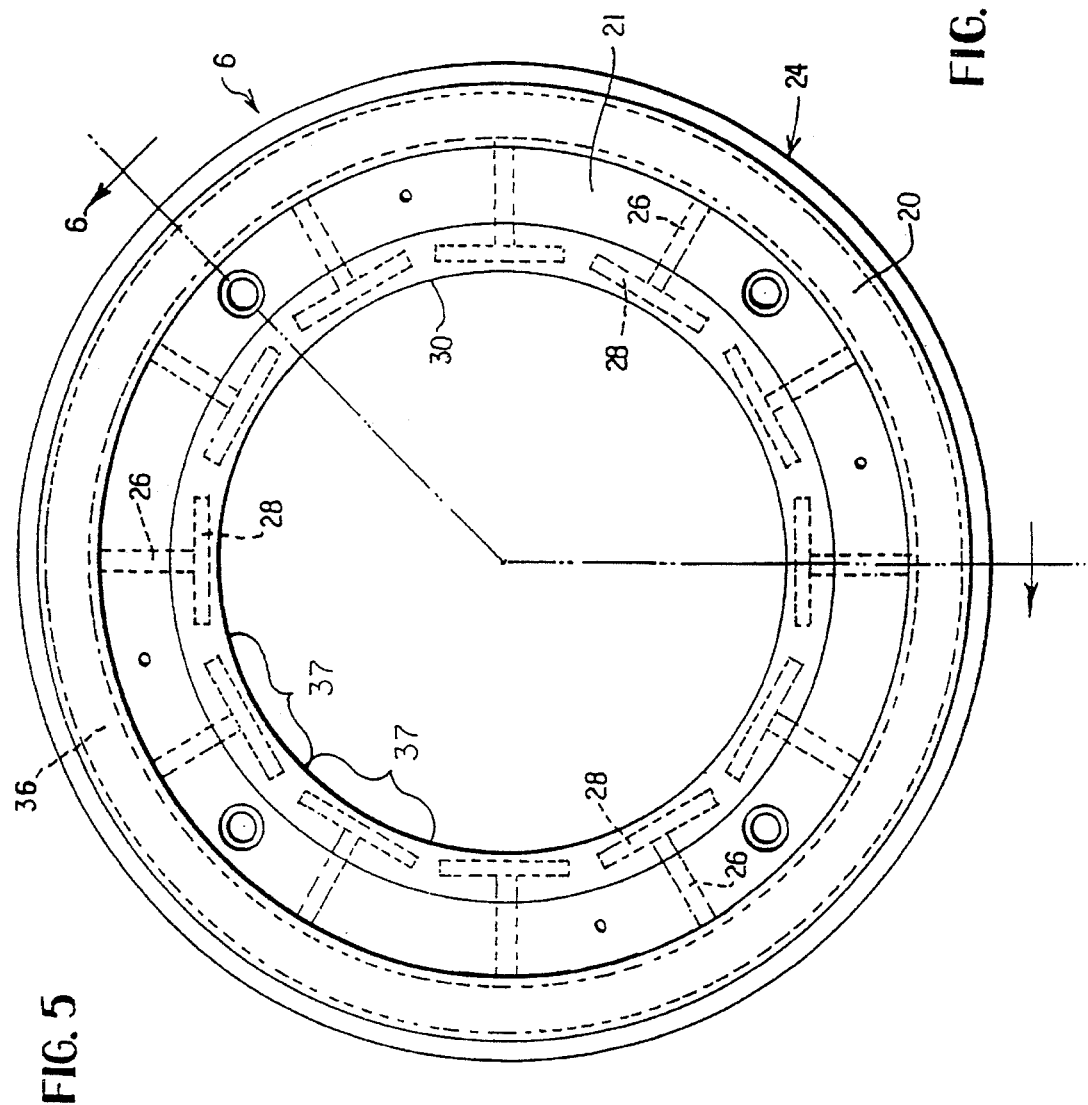
FIG. 5 is an end view of an oil ring used in the die assembly.

As shown in FIG. 5, each sector 37 includes a separate oil passageway. Hot oil at a particular temperature is allowed to flow in an oil passageway through a sector 37. The sector 37 is either heated or cooled relative to the other sectors, depending on the temperature and flow velocity of the hot oil. The temperature difference is conducted to the corresponding area of inner lip surface 18 of outer die lip 6, within the die, past which molten plastics resin flows. The molten resin flows faster if the sector is hotter or slower if the sector is cooler, effecting the desired change in the final material thickness, corresponding to the temperature of the sector. A flow control valve 14 is employed for each sector to meter the hot oil.

The oil used is typically heat transfer oil operating in the 200° to 600° F. range. The hot oil may be used to heat the die or cool the die, depending on the desired operating temperature of the die zones relative to the temperature to which the flowing resin elevates the temperature of these parts. The temperature on the different areas of lip surface affects only the flow rate of the resin flowing past each area. Since the plastics resin is moving rapidly, only the boundary layer is affected by the difference. The major volume of resin between the lips remains very close to the originally determined melt temperature.

FIGS. 5 and 6 show the oil ring structure, in detail. Oil ring covers 20, 22 are welded to opposite faces 21, 23 of oil ring 24 at welds 25, indicated by the arrows in FIG. 6, to provide air-tight welds. In a typical non-limiting example, the welds are tested for air-tightness at 75 psi.

Oil ring 24 is divided into twelve equal sectors 37 through which oil flows. As shown in FIG. 6, a typical oil inlet passage 26 allows oil to flow to oil circulating passageway 28 adjacent inner surface 30 of oil ring 24. The oil flows out of each sector through oil outlet passage 32. The hot oil for entry into each oil inlet passage 26 enters through oil inlet 34 and is circulated through oil channel 36 which passes around oil ring 24. Oil leaving each oil outlet passage 32 passes into oil channel 38 and exits through oil outlet 40. A single oil flow control valve 14, shown in FIG. 2, is threaded into oil inlet 34, communicating with oil channel 36.

Control of sector oil flow may be manual or automated. An automated method may use feedback from a sheet thickness measuring gauge monitoring the product. The information received is preferably processed automatically and used to automatically control the oil flow in each sector to provide the required sheet thickness around the circumference of the extrudate. The apparatus allows close control of the width of the die gap immediately adjacent the die lip to allow the gap to be independently adjusted in a plurality of areas around the periphery of the die lip.

It should be realized that the following are salient features of the present invention:

1. The hot oil can be used to heat or cool the die or die sectors and yet still effect the same type of adjustment required for sheet thickness but in reverse. Previous systems operate only by local heating so if the die or lip surface is already too hot from the flow of the plastic, additional heat is undesirable.

2. Oil, as the heating/cooling medium, provides more uniform and complete temperature control by:
   a. Contacting more surface area near the melt path; and
   b. providing a continuous control of the temperature desired rather than the "on/off" control provided by electric heaters.

While the invention has been described above with respect to certain embodiments thereof, it will be appreciated that variations and modifications may be made without departing from the spirit and scope of the invention.

What is claimed is:

1. An extruder apparatus for extruding thermoplastic material, which apparatus comprises:

a) an extruder housing having an inlet and an outlet and a bore therebetween for the passage of thermoplastic material from the inlet to the outlet through the bore;

b) an extrusion die means adjacent the outlet and comprising an inner die lip and an outer die lip, which form a concentric die gap therebetween for the extrusion of thermoplastic material therethrough of selected wall thickness, the die gap in thermoplastic flow communication with the said bore; and c) the outer die lip having a heat transfer oil therein and having an inner circumferential surface about and in a heat-conductive relationship with the thermoplastic material to be extruded, the outer die lip having:
      i) annular first and second oil flow channels for the circulation of heat transfer oil;
      ii) an oil inlet for introduction into the first channel and the circulation of heat transfer oil therein of a selected temperature;
      iii) an oil outlet for the withdrawal of circulated oil from the second channel for reheating or cooling;
      iv) a plurality of separate circumferential sectors in the outer die lip each having a circulating oil passageway therein adjacent and parallel to the inner surface, and the length substantially of the inner surface; and
      v) each sector having an inlet oil passageway from the first channel to the circulating oil passageway and an outlet oil passageway from the circulating oil passageway to the second channel; and a valve control means in the oil inlet passageway to control the flow of oil into the circulating oil passageway of each sector, whereby heat transfer oil of selected temperature is circulated through the plurality of sectors at a controlled flow rate for each sector to adjust and control the flow rate of the thermoplastic material passing through the gap and the resulting wall thickness of the extruded thermoplastic material.

2. The apparatus of claim 1 which includes bolt means to provide for the coarse adjustment of the concentric die gap by mechanical movement of the outer die lip.

3. The apparatus of claim 1 wherein the first and second channels are axially aligned in the and at the outer periphery of the outer die lip.

4. The apparatus of claim 1 wherein the inlet oil passageway extends radially to the circulating oil passageway and the outlet oil passageway extends radially from the circulating oil passageway to permit the radial introduction into and withdrawal of the oil from the circulating oil passageway of each sector.

5. The apparatus of claim 4 wherein the length of the circulating oil passageways of the sectors together approach substantially the circumference of the inner surface of the outer die lip.

6. The apparatus of claim 1 wherein the sectors are uniform in size and shape about the total circumference of the inner surface of the outer die lip.

7. The apparatus of claim 4 wherein the circulating oil passageways extend between the oil inlet passageway and the oil outlet passageway of each sector.

8. An extruder apparatus for extruding thermoplastic material, which apparatus comprises:
   a) an extruder housing having an inlet and an outlet and an axial bore therebetween for the passage of thermoplastic material from the inlet to the outlet through the bore;
   b) extrusion die means adjacent the outlet and comprising an inner die lip and an outer die lip which form a concentric die gap therebetween for the extrusion of thermoplastic material therethrough of selected thickness, the die gap in thermoplastic flow communication with the said bore; and
   c) the outer die lip having a heat transfer oil therein and having an inner circumferential surface about and in a heat-conductive relationship with the thermoplastic material to be extruded, the outer die lip having:
      i) annular first and second oil flow channels axially aligned in the outer die lip and at the outer periphery of the outer die lip for the circulation of heat transfer oil therein;
      ii) an oil inlet for the introduction and circulation into the first channel of the heat transfer oil of a selected temperature;
      iii) an oil outlet for the withdrawal of circulated heat transfer oil from the second channel for reheating or cooling;
      iv) a plurality of separate uniform sectors each having a circulating oil passageway therein extending adjacent the inner surface of the outer die lip and generally parallel to the inner surface of the outer die lip and in total forming substantially the circumference of the inner surface of the outer die lip, and
      v) each sector having a radial inlet oil passageway from the first channel to the circulating oil passageway and a radial outlet oil passageway, from the circulating oil passageway to the second channel; and
   d) an adjustable valve control means to control the flow of oil through each sector, whereby heat transfer oil of selected temperature is circulated through the plurality of sectors at a controlled flow rate for each sector to adjust and control the flow rate of the thermoplastic material passing through the gap and the resulting wall thickness of the extruded thermoplastic material.

* * * * *